UNITED STATES PATENT OFFICE.

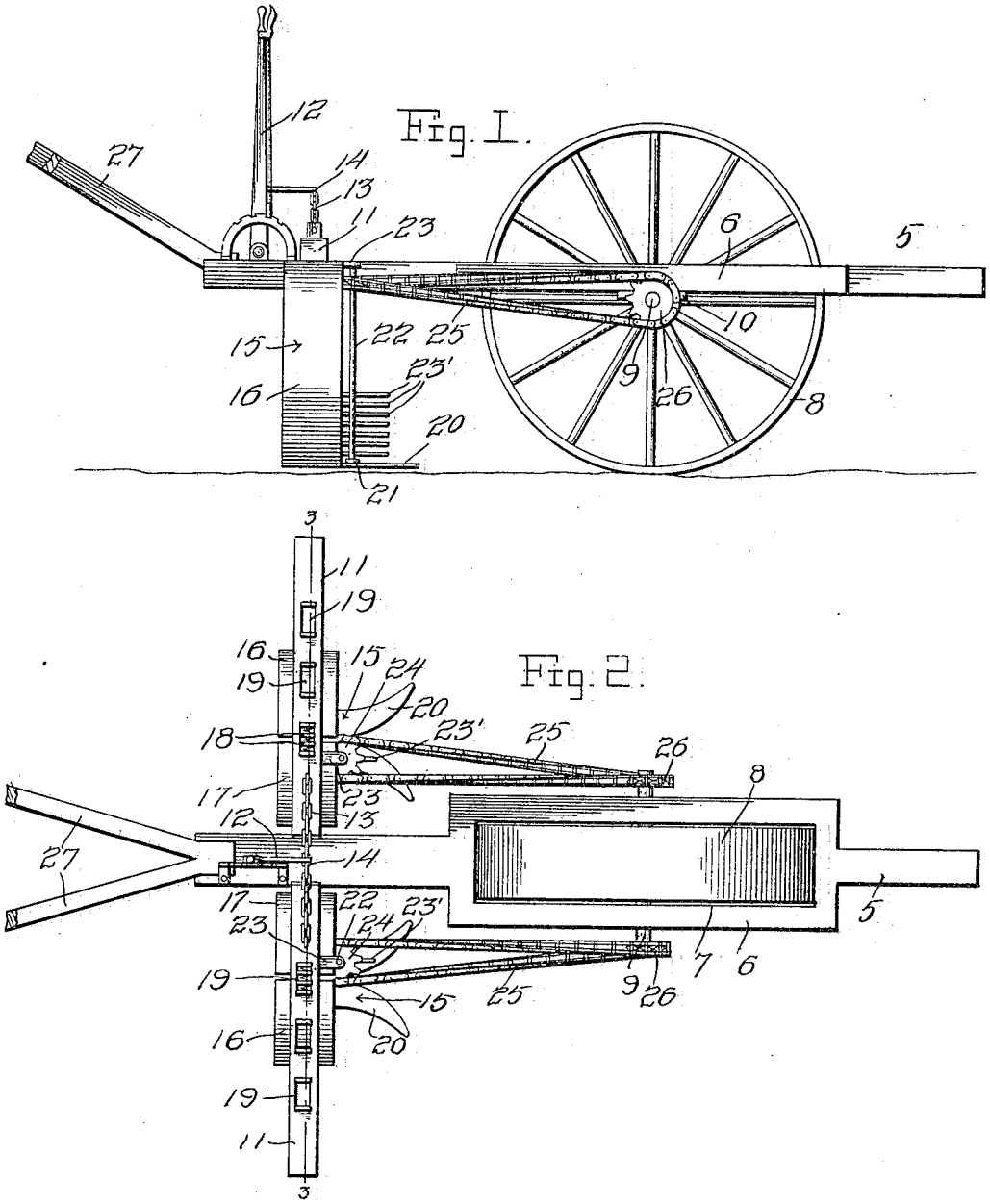

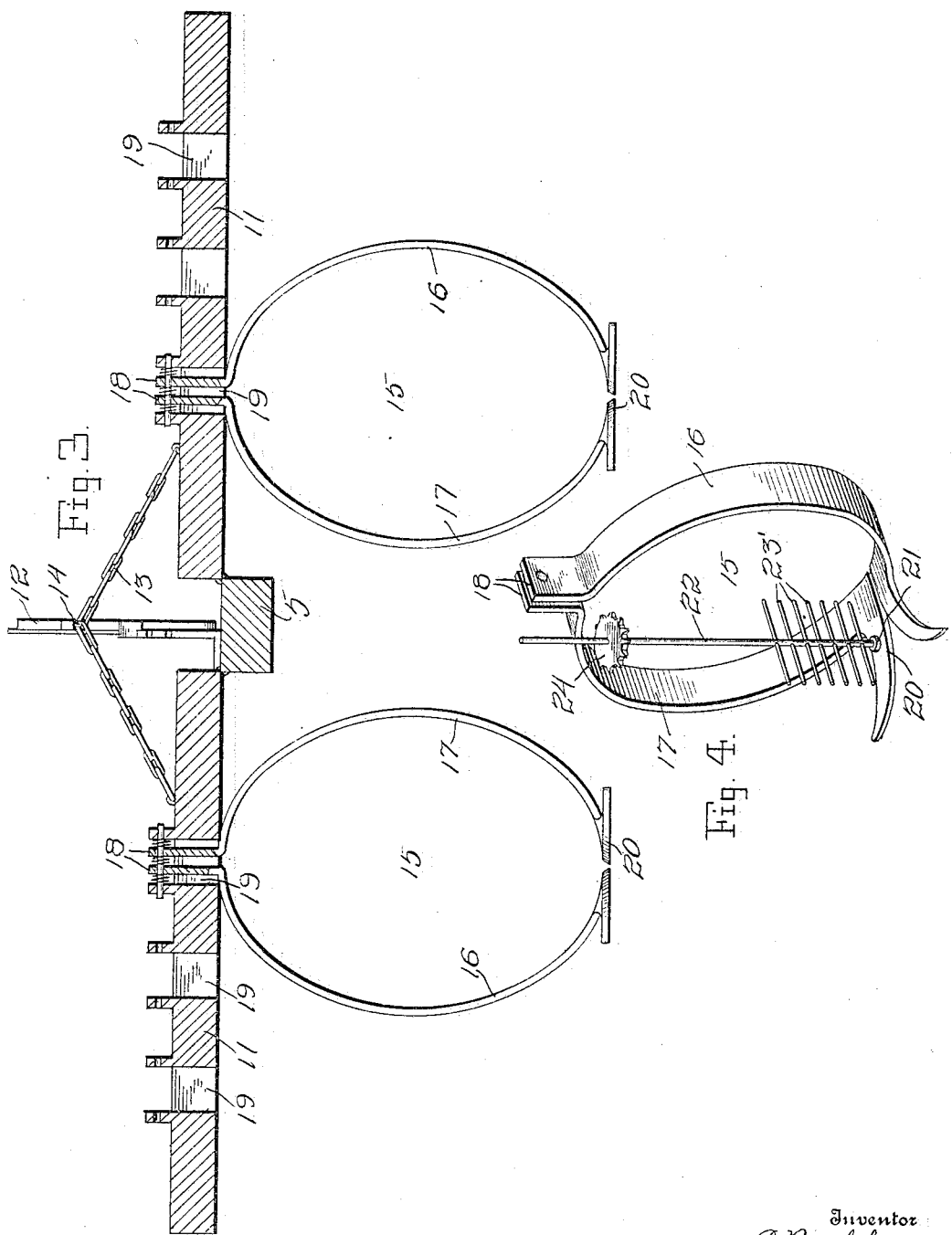

CARL RUEHLE, OF ORANGEVILLE, ILLINOIS.

BEAN-HARVESTER.

No. 809,751.        Specification of Letters Patent.        Patented Jan. 9, 1906.

Application filed August 10, 1905. Serial No. 273,559.

*To all whom it may concern:*

Be it known that I, CARL RUEHLE, a citizen of the United States, residing at Orangeville, in the county of Stephenson, State of Illinois, have invented certain new and useful Improvements in Bean-Harvesters; and I do hereby declare the following to be a full, clear, and exact description of the invention, such as will enable others skilled in the art to which it appertains to make and use the same.

This invention relates to farm implements, and more particularly to bean-harvesters, and has for its object to provide an implement by means of which beans may be quickly and easily harvested and which will be adjustable to suit different conditions.

Other objects and advantages will be apparent from the following specification, which describes an embodiment of the present invention.

In the drawings forming a portion of this specification, and in which like numerals of reference indicate similar parts in the several views, Figure 1 is a side elevation of the present implement. Fig. 2 is a top plan view. Fig. 3 is a transverse section on line 3 3 of Fig. 2 looking forwardly toward the beaters. Fig. 4 is a detail perspective view of one of the pulling mechanisms removed from the implement.

Referring now to the drawings, the present invention comprises a longitudinally-extending beam 5, including a central broadened portion 6, having a central longitudinal slot 7, within which is disposed a ground-wheel 8, mounted upon a transverse axle 9 for rotation therewith, this axle being journaled in bearing-blocks 10, depending from the portion 6 of the beam.

A pair of cross-beams 11 are hinged at their inner ends to the beam 5 rearwardly of the portion 6 thereof, these beams lying in alinement with each other and being movable to extend laterally in opposite directions, and thus in alinement, or to extend upwardly from the beam, a lever 12 being pivoted to the beam 5 and being connected with the beams 11 for movement of the latter. This connection consists of a chain 13, connected at its ends with the beams 11 adjacent to their inner ends and having a link 14 connected therewith at one end, the other end of the link being connected with the lever, the connection of the link and chain being at a point between the ends of the latter.

A pair of pulling mechanisms 15 are provided, each consisting of two arcuate plates 16 and 17, which are disposed with their concave surfaces toward each other, the plates lying in a common vertical plane and having stems 18 at their upper end which are engaged in openings 19, formed in the beams 11. Each of these beams is provided with a plurality of these openings 19, and the stems 18 are adapted for interchangeable engagement in these several openings, so that the pulling mechanisms are adjustable toward and away from each other. The lower ends of the plates 16 and 17 of each of the pulling mechanisms lie in close relation, and each plate has a forwardly-extending guide 20 at its lower end, the guides diverging, as shown, for the reception of bean-stalks therebetween. The plate 17 is the inner plate in each instance, and adjacent to their lower ends these plates 17 have bearings 21, in which are journaled the upwardly-extending shafts 22, which thus lie inwardly of the spaces between the lower ends of the plates. The upper ends of these shafts 22 are journaled in plates 23, which extend forwardly from the beams 11, and the shafts 22 have laterally-extending fingers 23', these shafts with their fingers forming beaters.

Adjacent to their upper ends the shafts 22 are provided with sprockets 24, which are connected, by means of chains 25, with sprockets 26, which are carried by the shaft 9. Rearwardly-extending handles 27 are provided, by means of which the implement may be guided, and means for varying the distance between the lower ends of the plates 16 and 17 is also provided.

In operation the implement is moved over the ground and the rows of beans are allowed to pass between the guides 20 of each of the pulling mechanisms and are engaged by the lower ends of the plates 16 and 17, which pull the plants from the ground. At the same time the beaters are revolved, and the fingers 23, striking the plant, move them rearwardly through the space between the plates, thus disengaging them from the latter and allowing them to fall to the ground, after which they may be dealt with in any suitable manner. By reason of the fact that the pulling mechanisms are adjustable toward and away from each other they may be adjusted to suit different distances between the rows.

What is claimed is—

1. An implement of the class described comprising a longitudinal beam having a broadened portion intermediate of its ends and having a longitudinal slot in the broadened portion, brackets carried by the broadened portion, an axle revolubly mounted in the brackets, a wheel mounted upon the axle for rotation therewith and extending through the slot, pulling mechanism carried by the rearward portion of the beam, beaters carried by the pulling mechanism, and connections between said beaters and the axle for operation of the former when the latter is revolved.

2. An implement of the class described comprising a longitudinal beam, transverse beams hinged at their inner ends to the longitudinal beam adjacent to the rearward end thereof, rotatable plant-beating mechanisms carried by the beams, a ground-wheel, connections between the ground-wheel and the beating mechanism for operation of the latter when the ground-wheels are revolved, and means for moving the transverse beams upon their hinges to bring the beating mechanisms into and out of operative position.

3. An implement of the class described comprising a beam, laterally-extending beams carried by the first-named beam and each having a plurality of openings therein, pairs of arcuate plates disposed with their concave surfaces toward each other and having stems at their upper ends removably engaged in the openings, the lower ends of the plates of each pair lying in close relation, the inner plate of each pair having a bearing therein, a shaft journaled in said bearing, plates carried by the second-named beams and in which the upper ends of the shafts are revolubly engaged, laterally-extending fingers carried by the shafts and arranged to engage plants disposed between the plates, guides carried by each pair of plates and arranged to direct plants between the plates, a shaft journaled upon the first-named beam, connections between said shaft and the first-named shafts for simultaneous rotation thereof, and a ground-wheel carried by the second-named shaft.

In testimony whereof I affix my signature in presence of two witnesses.

CARL RUEHLE.

Witnesses:
G. I. CADWELL,
W. H. RUMMEL.